(12) United States Patent
Kim et al.

(10) Patent No.: US 10,038,903 B2
(45) Date of Patent: Jul. 31, 2018

(54) METHOD AND APPARATUS FOR SAMPLE ADAPTIVE OFFSET PARAMETER ESTIMATION IN VIDEO CODING

(71) Applicant: Texas Instruments Incorporated, Dallas, TX (US)

(72) Inventors: Woo-Shik Kim, San Diego, CA (US); Madhukar Budagavi, Plano, TX (US); Minhua Zhou, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 126 days.

(21) Appl. No.: 13/784,599

(22) Filed: Mar. 4, 2013

(65) Prior Publication Data

US 2013/0182759 A1    Jul. 18, 2013
US 2016/0337641 A9    Nov. 17, 2016

Related U.S. Application Data

(63) Continuation-in-part of application No. 13/530,920, filed on Jun. 22, 2012.

(60) Provisional application No. 61/607,069, filed on Mar. 6, 2012, provisional application No. 61/608,386, filed on Mar. 8, 2012, provisional application No. 61/499,863, filed on Jun. 22, 2011, provisional
(Continued)

(51) Int. Cl.
*H04N 7/26* (2006.01)
*H04N 19/117* (2014.01)
*H04N 19/82* (2014.01)
*H04N 19/86* (2014.01)

(52) U.S. Cl.
CPC .......... *H04N 19/117* (2014.11); *H04N 19/82* (2014.11); *H04N 19/86* (2014.11)

(58) Field of Classification Search
None
See application file for complete search history.

(56) References Cited

U.S. PATENT DOCUMENTS

| 8,660,174 B2 * | 2/2014 | Fu et al. ................ 375/240 |
| 2012/0082244 A1 * | 4/2012 | Chen ............. H04N 19/00103 375/240.29 |

(Continued)

OTHER PUBLICATIONS

Ken McCann et al, "Samsung's Response to the Call for Proposals on Video Compression Technology", JCTVC-A124, Joint Collaborative Team on Video Coding (JCT-VC) of ITU-T SG16 WP3 and ISO/IEC JTC1/SC29/W11, pp. 1-40, Apr. 15-23, 2010, Dresden, Germany.

(Continued)

*Primary Examiner* — Andy Rao
*Assistant Examiner* — Samuel D Fereja
(74) *Attorney, Agent, or Firm* — Gregory J. Albin; Charles A. Brill; Frank D. Cimino

(57) ABSTRACT

A method for sample adaptive offset (SAO) filtering in a video encoder is provided that includes estimating SAO parameters for color components of a largest coding unit (LCU) of a picture, wherein estimating SAO parameters includes using at least some non-deblock-filtered reconstructed pixels of the LCU to estimate the SAO parameters, performing SAO filtering on the reconstructed LCU according to the estimated SAO parameters, and entropy encoding SAO information for the LCU in a compressed video bit stream, wherein the SAO information signals the estimated SAO parameters for the LCU.

2 Claims, 8 Drawing Sheets

Related U.S. Application Data application No. 61/500,280, filed on Jun. 23, 2011, provisional application No. 61/502,399, filed on Jun. 29, 2011, provisional application No. 61/538,289, filed on Sep. 23, 2011, provisional application No. 61/559,922, filed on Nov. 15, 2011.

(56) References Cited

U.S. PATENT DOCUMENTS

| | | | |
|---|---|---|---|
| 2012/0106624 A1* | 5/2012 | Huang | H04N 19/117 375/240.02 |
| 2012/0177107 A1* | 7/2012 | Fu et al. | 375/240.03 |
| 2012/0287988 A1* | 11/2012 | Chong et al. | 375/240.02 |
| 2012/0294353 A1* | 11/2012 | Fu et al. | 375/240.02 |
| 2013/0022103 A1 | 1/2013 | Budagavi | |
| 2013/0114683 A1* | 5/2013 | Zhao et al. | 375/240.03 |

OTHER PUBLICATIONS

Yu-Wen Huang et al, "In-Loop Adaptive Restoration", JCTVC-B077, Joint Collaborative Team on Video Coding (JCT-VC) of ITU-T SG16 WP3 and ISO/IEC JTC1/SC29/W11, pp. 1-11, Jul. 21-28, 2010, Geneva, Switzerland.

Chih-Ming Fu et al, "TE10 Subtest 3: Quadtree-Based Adaptive Offset", JCTVC-C147, Joint Collaborative Team on Video Coding (JCT-VC) of ITU-T SG16 WP3 and ISO/IEC JTC1/SC29/W11, pp. 1-6, Oct. 7-15, 2010, Guangzhou, China.

Chih-Ming Fu et al, "CE8 Subset3: Picture Quadtree Adaptive Offset", JCTVC-D122, Joint Collaborative Team on Video Coding (JCT-VC) of ITU-T SG16 WP3 and ISO/IEC JTC1/SC29/W11, pp. 1-10, Jan. 20-28, 2011, Daegu, Korea.

Chih-Ming Fu et al, "CE8 Subset3: Picture Quadtree Adaptive Offset", JCTVC-D122 Presentation, Joint Collaborative Team on Video Coding (JCT-VC) of ITU-T SG16 WP3 and ISO/IEC JTC1/SC29/W11, pp. 1-9, Jan. 20-28, 2011, Daegu, Korea.

Chih-Ming Fu et al, "CE13: Sample Adaptive Offset with LCU-Independent Decoding", JCTVC-E049, Joint Collaborative Team on Video Coding (JCT-VC) of ITU-T SG16 WP3 and ISO/IEC JTC1/SC29/W11, pp. 1-6, Mar. 16-23, 2011, Geneva, Switzerland.

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/W11, pp. 1-215, Mar. 16-23, 2011, Geneva, Switzerland.

Benjamin Bross et al,"WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/W11, pp. 1-217, Jul. 14-22, 2011, Torino, Italy.

"TMS320DM6467 Digital Media System-on-Chip", SPRS403G, Texas Instruments Incorporated, Dec. 2007, revised Oct. 2010, pp. 1-355.

Chih-Ming Fu et al, "Sample Adaptive Offset for HEVC", 2011 IEEE 13th International Workshop on Multimedia Signal Processing (MMSP), pp. 1-5, Oct. 17-19, 2011, Hangzhou, China.

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/W11, pp. 1-293, Oct. 10-19, 2012, Shanghai, China.

Guillaume Laroche et al, "Non-CE1: On SAO Parameters Reduction for Chroma", JCTVC-I0183, Joint Collaborative Team on Video Coding (JCT-VC) of ITU-T SG16 WP3 and ISO/IEC JTC1/SC29/W11, pp. 1-5, Apr. 27-May 7, 2012, Geneva, Switzerland.

Do-Kyoung Kwon and Woo-Shik Kim, "Non-CE1: Edge Offset Index Coding for LCU-Based SAO", JCTVC-I0261, Joint Collaborative Team on Video Coding (JCT-VC) of ITU-T SG16 WP3 and ISO/IEC JTC1/SC29/W11, pp. 1-5, Apr. 27-May 7, 2012, Geneva, Switzerland.

Koohyar Minoo et al, "Non-CE1: Coding of SAO Merge Left and Merge Up", JCTVC-I0507, Joint Collaborative Team on Video Coding (JCT-VC) of ITU-T SG16 WP3 and ISO/IEC JTC1/SC29/W11, pp. 1-7, Apr. 27-May 7, 2012, Geneva, Switzerland.

Koohyar Minoo et al, "Non-CE1: Coding of SAO Merge Left and Merge Up", JCTVC-I0507 Presentation, Joint Collaborative Team on Video Coding (JCT-VC) of ITU-T SG16 WP3 and ISO/IEC JTC1/SC29/W11, pp. 1-4, Apr. 27-May 7, 2012, Geneva, Switzerland.

Elena Alshina et al, "Non-CE1: On SAO Type Sharing Between Color Component", JCTVC-0590, Joint Collaborative Team on Video Coding (JCT-VC) of ITU-T SG16 WP3 and ISO/IEC JTC1/SC2/W11, pp. 1-10, Apr. 27-May 7, 2012, Geneva, Switzerland.

Benjamin Bross et al, "High Efficiency Video Coding (HEVC) Text Specification Draft 7", JCTVC-I1003_d1, Joint Collaborative Team on Video Coding (JCT-VC) of ITU-T SG16 WP3 and ISO/IEC JTC1/SC29/W11, pp. 1-256, Apr. 27-May 7, 2012, Geneva, Switzerland.

E. Alshina et al, "AhG6: On SAO Type Sharing Between U and V Components", JCTVC-J0045, Joint Collaborative Team on Video Coding (JCT-VC) of ITU-T SG16 WP3 and ISO/IEC JTC1/SC29/W11, pp. 1-7, Jul. 11-20, 2012, Stockholm, Sweden.

E. Alshina et al, "AhG6: On SAO Type Sharing Between U and V Components", JCTVC-J0045 Presentation, Joint Collaborative Team on Video Coding (JCT-VC) of ITU-T SG16 WP3 and ISO/IEC JTC1/SC29/W11, pp. 1-9, Jul. 11-20, 2012, Stockholm, Sweden.

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/W11, pp. 1-223, Nov. 21-30, 2011, Geneva, Switzerland.

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/W11, pp. 1-249, Nov. 21-30, 2011, Geneva, Switzerland.

Chih-Ming Fu et al, "CE8.a.3: SAO with LCU-Based Syntax", JCTVC-H0273, Joint Collaborative Team on Video Coding (JCT-VC) of ITU-T SG16 WP3 and ISO/IEC JTC1/SC29/W11, pp. 1-8, Feb. 1-10, 2012, San Jose, CA.

Koohyar Minoo and David Baylon, "Coding of SAO Merge Left and Merge Up Flags", JCTVC-J0355-r2, Joint Collaborative Team on Video Coding (JCT-VC) of ITU-T SG16 WP3 and ISO/IEC JTC1/SC29/W11, pp. 1-8, Jul. 11-20, Stockholm, Sweden.

Koohyar Minoo and David Baylon, "Coding of SAO Merge Left and Merge Up Flags", JCTVC-J0355-r2 Presentation, Joint Collaborative Team on Video Coding (JCT-VC) of ITU-T SG16 WP3 and ISO/IEC JTC1/SC29/W11, pp. 1-8, Jul. 11-20, Stockholm, Sweden.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/W11, pp. 1-250, Jul. 11-20, 2012, Stockholm, Sweden.

Woo-Shik Kim, "AhG6: SAO Parameter Estimation Using Non-Deblocked Pixels" JCTVC-J0139, Joint Collaborative Team on Video Coding (JCT-VC) of ITU-T SG16 WP3 and ISO/IEC JTC1/SC29/W11, pp. 1-7, Jul. 11-20, 2012, Stockholm, Sweden.

Woo-Shik Kim, "AhG6: SAO Parameter Estimation Using Non-Deblocked Pixels" JCTVC-J0139 Presentation, Joint Collaborative Team on Video Coding (JCT-VC) of ITU-T SG16 WP3 and ISO/IEC JTC1/SC29/W11, pp. 1-6, Jul. 11-20, 2012, Stockholm, Sweden.

* cited by examiner

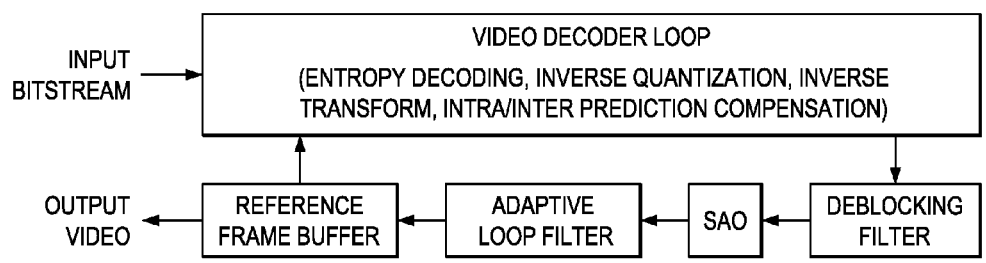
FIG. 1
FIG. 2
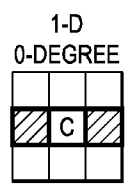 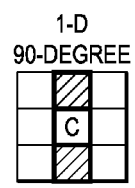 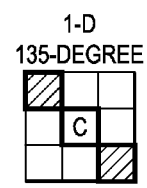 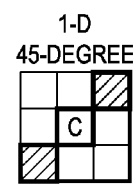
FIG. 3A    FIG. 3B    FIG. 3C    FIG. 3D

METHOD AND APPARATUS FOR SAMPLE ADAPTIVE OFFSET PARAMETER ESTIMATION IN VIDEO CODING

CROSS-REFERENCE TO RELATED APPLICATIONS

This application in a continuation of application Ser. No. 13/530,920 filed on Jun. 22, 2012, which claims priority to U.S. Provisional Application No. 61/499,863, filed on Jun. 22, 2011, U.S. Provisional Application No. 61/500,280, filed on Jun. 23, 2011, U.S. Provisional Application No. 61/502,399, filed Jun. 29, 2011. This application claims priority to U.S. Provisional Application No. 61/607,069, filed Mar. 6, 2012, U.S. Provisional Application No. 61/608,386, filed Mar. 8, 2012 and U.S. Provisional Application No. 61/538,289, filed on Sep. 23, 2011and U.S. Provisional Application No. 61/559,922, filed on Nov. 15, 2011. All of which are herein incorporated by reference.

FIELD OF THE INVENTION

This invention generally relates to sample adaptive offset parameter estimation for video coding.

BACKGROUND OF THE INVENTION

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and coding of the transform coefficients.

In a coding scheme that uses block-based prediction, transform coding, and quantization, some characteristics of the compressed video data may differ from the original video data. For example, discontinuities referred to as blocking artifacts can occur in the reconstructed signal at block boundaries. Further, the intensity of the compressed video data may be shifted. Such intensity shift may also cause visual impairments or artifacts. To help reduce such artifacts in decompressed video, the emerging HEVC standard defines three in-loop filters: a deblocking filter to reduce blocking artifacts, a sample adaptive offset filter (SAO) to reduce distortion caused by intensity shift, and an adaptive loop filter (ALF) to minimize the mean squared error (MSE) between reconstructed video and original video. As illustrated in FIG. 1, these filters may be applied sequentially, and, depending on the configuration, the SAO and ALF loop filters may be applied to the output of the deblocking filter.

SUMMARY

Embodiments of the current invention relate to methods, apparatus, and computer readable media for SAO parameter estimation. In one aspect, a method for sample adaptive offset (SAO) filtering in a video encoder is provided that includes estimating SAO parameters for color components of a largest coding unit (LCU) of a picture, wherein the estimating includes using at least some non-deblock-filtered reconstructed pixels of the LCU to estimate the SAO parameters, performing SAO filtering on the reconstructed LCU according to the estimated SAO parameters, and entropy encoding SAO information for the LCU in a compressed video bit stream, wherein the SAO information signals the estimated SAO parameters for the LCU.

In one aspect, an apparatus configured to perform sample adaptive offset (SAO) filtering during encoding of a video sequence is provide that includes means for estimating SAO parameters for color components of a largest coding unit (LCU) of a picture, wherein estimating SAO parameters includes using at least some non-deblock-filtered reconstructed pixels of the LCU to estimate the SAO parameters, means for performing SAO filtering on reconstructed pixels of the LCU according to the estimated SAO parameters, and means for entropy encoding SAO information for the LCU in a compressed video bit stream, wherein the SAO information signals the estimated SAO parameters for the LCU.

In one aspect, a non-transitory computer-readable medium storing software instructions is provided. The software instructions, when executed by at least one processor, cause the at least one processor to execute a method for sample adaptive offset (SAO) filtering during encoding of a video sequence. The method includes estimating SAO parameters for color components of a largest coding unit (LCU) of a picture, wherein estimating SAO parameters includes using at least some non-deblock-filtered reconstructed pixels of the LCU to estimate the SAO parameters, performing SAO filtering on the reconstructed LCU according to the estimated SAO parameters, and entropy encoding SAO information for the LCU in a compressed video bit stream, wherein the SAO information signals the estimated SAO parameters for the LCU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is an embodiment depicting a decoding architecture of HEVC with ALF and SAO;

FIG. 2 is an embodiment depicting a band Offset (BO) group classification;

FIGS. 3A-3D are an embodiment depicting edge offset pixel classification patterns;

DETAILED DESCRIPTION OF EMBODIMENTS OF THE INVENTION

Figure 4:
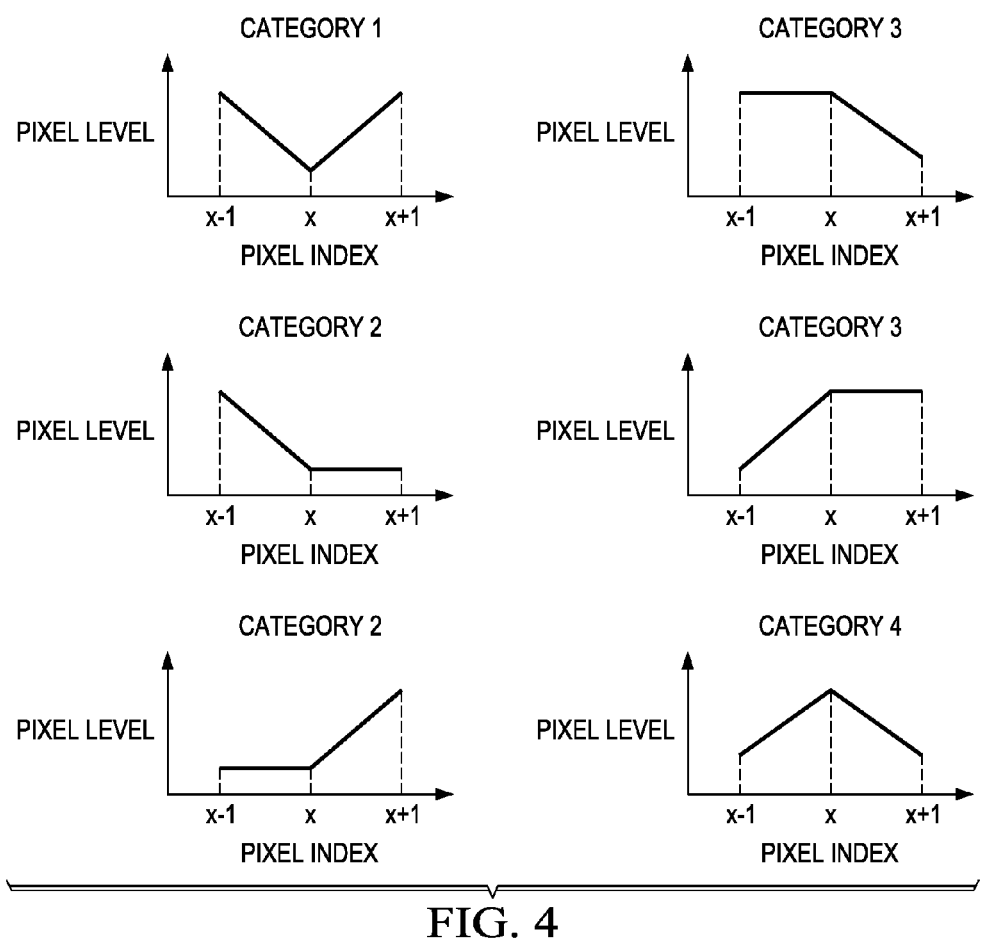
FIG. 4 is an embodiment depicting an illustration of edge offset categories.

As used herein, the term "picture" may refer to a frame or a field of a frame. A frame is a complete image captured during a known time interval. For convenience of description, embodiments are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003_dK, Joint Collaborative Team on Video Coding (JCT-VC) of ITU-T SG16 WP3 and ISO/IEC JTC1/SC29/WG1, San Jose, Calif., Feb. 1-10, 2012, ("HEVC Draft 6"), B. Bross, et al., "High Efficiency Video Coding (HEVC) Text Specification Draft 7," JCTVC-I1003_d1, Joint Collaborative Team on Video Coding (JCT-VC) of ITU-T SG16 WP3 and ISO/IEC JTC1/SC29/WG1, Geneva, CH, Apr. 10-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), and B. Bross, et al., "High Efficiency Video Coding (HEVC) Text Specification Draft 9," JCTVC-K1003_v13, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9").

Some aspects of this disclosure have been presented to the JCT-VC in W. Kim, "AhG6: SAO Parameter Estimation Using Non-Deblocked Pixels," JCTVC-J0139, Joint Collaborative Team on Video Coding (JCT-VC) of ITU-T SG16 WP3 and ISO/IEC JTC1/SC29/WG11, Stockholm, SE, Jul. 11-20, 2012, which is incorporated by reference herein.

SAO involves adding an offset directly to the reconstructed pixels from the video decoder loop in FIG. 1. The offset value applied to each pixel depends on the local characteristics surrounding that pixel. There are two kinds of offsets, namely band offsets (BO) and edge offsets (EO). The band offset classifies pixels by intensity interval of the reconstructed pixel, while edge offset classifies pixels based on edge direction and structure. FIG. 2 is an embodiment depicting a band offset (BO) group classification. For band offset, the pixel is classified into one of 32 band and 4 offsets are provided that corresponds to 4 consecutive bands, of which the starting band is signaled.

For EO, the pixels can be filtered in one of four directions shown in FIGS. 3A-D. For each edge direction, a category number c for a pixel is computed as $c = \text{sign}(p0-p1) + \text{sign}(p0-p2)$ where $p0$ is the pixel and $p1$ and $p2$ are neighboring pixels, i.e., the "shaded" pixels of FIGS. 3A-3D. The edge conditions that result in classifying a pixel into a category are shown in Table 1 and are also illustrated in FIG. 4. After the pixels are classified, offsets are generated for each of categories 1-4. The offset for a category may be computed as an average of the differences between the original pixel values and the reconstructed pixel values of the pixels in the region classified into the category.

TABLE 1

| Category | Condition |
| --- | --- |
| 1 | $p0 < p1$ and $p0 < p2$ |
| 2 | ($p0 < p1$ and $p0 = p2$) or ($p0 < p2$ and $p0 = p1$) |
| 3 | ($p0 > p1$ and $p0 = p2$) or ($p0 > p2$ and $p0 = p1$) |
| 4 | $p0 > p1$ and $p0 > p2$ |
| 0 | none of above |

There are two levels of sample adaptive offset—picture level and largest coding unit (LCU) level. For LCU level sample adaptive offset processing, the sample adaptive offset parameters are estimated at the encoder side for each LCU. The encoder can also signal at the slice level whether or not SAO is enabled for a slice, e.g., the value of sample_adaptive_offset_flag can be set to enable SAO processing at the slice level.

For LCU level SAO, the encoder can signal SAO parameters such as the SAO filter type and the offsets. Table 2 is one example of the filter types (sao_type_idx) that may be signaled and the number of SAO offsets (NumSaoCategory) for each filter type in a version of HEVC. For each LCU, the sao_type_idx is signaled followed by offset values for the particular filter type.

TABLE 2

| sao_type_idx | NumSaoCategory | SAO type |
| --- | --- | --- |
| 0 | 0 | Not applied |
| 1 | 4 | 1D 0-degree edge |

TABLE 2-continued

| sao_type_idx | NumSaoCategory | SAO type |
|---|---|---|
| 2 | 4 | 1D 90-degree edge |
| 3 | 4 | 1D 135-degree edge |
| 4 | 4 | 1D 45-degree edge |
| 5 | 4 | Band offset |

Currently, the sample adaptive offset parameters are provided for each color component separately and include the SAO filter type, the starting band for BO, if applicable, and offset values. To estimate these parameters for an LCU, the encoder uses the reconstructed pixel values after the deblocking filter process is applied. However, this delays the encoding process as deblock filtering requires pixels from neighboring LCUs. Therefore, this restricts LCU based processing. One proposed solution is to use the pixels that have been deblock filtered for the SAO parameter estimation with no information for the pixels that have not been deblock filtered. However, this solution may cause performance degradation in SAO filtering.

Figure 5:
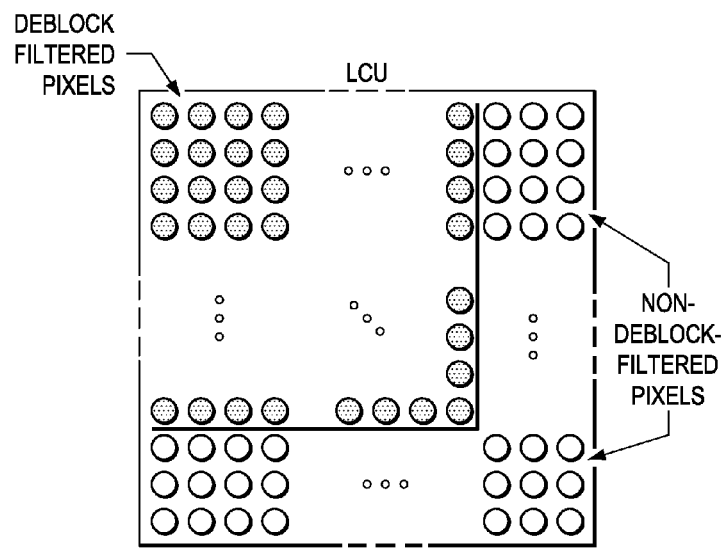
FIG. 5 is an embodiment depicting an illustration of pixels in a largest coding unit (LCU) with deblocking filter boundaries.

FIG. 5 shows an illustration of pixels in an LCU, where the solid lines indicates the boundaries between deblock filtered pixels and non-deblock-filtered pixels. The non-deblock-filtered pixels require reconstructed pixels in the neighboring LCUs, i.e., the right LCU and the bottom LCU, to perform deblock filtering. Note that the number of rows and columns of non-deblock-filtered pixels depends on the design of the deblocking filter. This may also different for each color component if different deblocking filter tap lengths are applied for each color component. For example, the deblocking filter tap lengths are 3 for luma, and 1 for chroma in the deblocking filter design in version HM-5.0 of the HEVC reference software.

Figure 8:
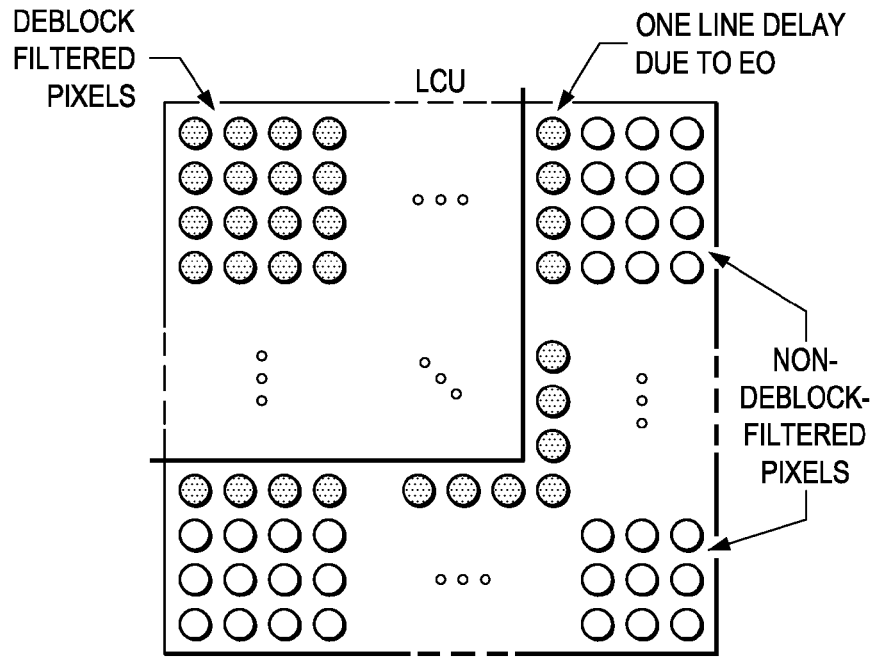
FIG. 8 is an embodiment illustrating deblock filtered and non-deblock-filtered pixels in an LCU.

In another example, in version HM-7.0 of the HEVC reference software, the bottom three lines of reconstructed pixels and the four right column lines are not available for SAO parameter estimation, i.e., are not deblocked filtered at the time SAO parameter estimation needs to be done for an LCU to avoid delay. In addition to these lines, one additional line may not be available for edge offset parameter estimation depending on the direction of the edge offset filter. FIGS. 3A-3D show the edge offset filter shapes. Note that one additional right column line may not be available for the shapes of FIGS. 3A, 3B, and 3D, and one additional bottom line may not available for the shapes of FIGS. 3B, 3C, and 3D. Table 3 shows the number of horizontal or vertical lines of non-deblock-filtered pixels, i.e., unavailable pixel lines, according to SAO type and color component in version HM-7.0 of the HEVC reference software. FIG. 8 shows an example of deblock filtered pixels and non-deblock-filtered pixels in the luma component of an LCU at the time SAO parameter estimation is to be performed.

TABLE 3

| | Luma | | Chroma | |
|---|---|---|---|---|
| sao_type_idx | bottom lines | right column lines | bottom lines | right column lines |
| 0 | N/A | N/A | N/A | N/A |
| 1 | 3 | 5 | 1 | 3 |
| 2 | 4 | 4 | 2 | 2 |
| 3 | 4 | 5 | 2 | 3 |
| 4 | 4 | 5 | 2 | 3 |
| 5 | 3 | 4 | 1 | 2 |

In embodiments of the invention, non-deblock-filtered pixels are used to estimate SAO parameters to enable LCU based processing. More specifically, in embodiments of the invention, the encoder estimates SAO parameters for an LCU using at least some non-deblock-filtered pixels in order to decrease or avoid the delay of waiting for the deblock filtering process to complete. In such embodiments, the SAO filtering using the estimated parameters is applied after the deblock filtering process is complete, i.e., the SAO filtering is applied to deblock filtered pixels while the parameters are estimated using at least some non-deblock-filtered pixels.

In some embodiments, the reconstructed pixels used for SAO parameter estimation for an LCU are all non-deblock-filtered reconstructed pixels of the LCU. That is, the SAO parameter estimation and the deblock filtering are both performed on reconstructed pixels of an LCU. In such embodiments, the SAO parameter estimation can be performed independently from the deblock filtering process. The estimated parameters are then applied during SAO processing to the deblock filtered pixels of the LCU.

In some embodiments, some deblock filtered pixels and some non-deblock-filtered pixels of an LCU are used for the SAO parameter estimation. Specifically, as illustrated in the examples of FIG. 5 and FIG. 8, the non-deblock-filtered pixels used are those that require that coding of the left and bottom neighboring LCUs be completed before these pixels can be deblock filtered. In such embodiments, SAO parameter estimation can be performed on an LCU that is partially deblock filtered without waiting until the deblock filtering process of the LCU is completed. Because such embodiments use the deblock filtered pixels available for an LCU, the accuracy of SAO estimation is improved as compared to using no deblock filtered pixels. Note that in such embodiments, as illustrated in FIG. 5 and FIG. 8, no delay is incurred due to waiting for the bottom and right neighboring LCUs to be coded as in the prior art.

Figure 7:
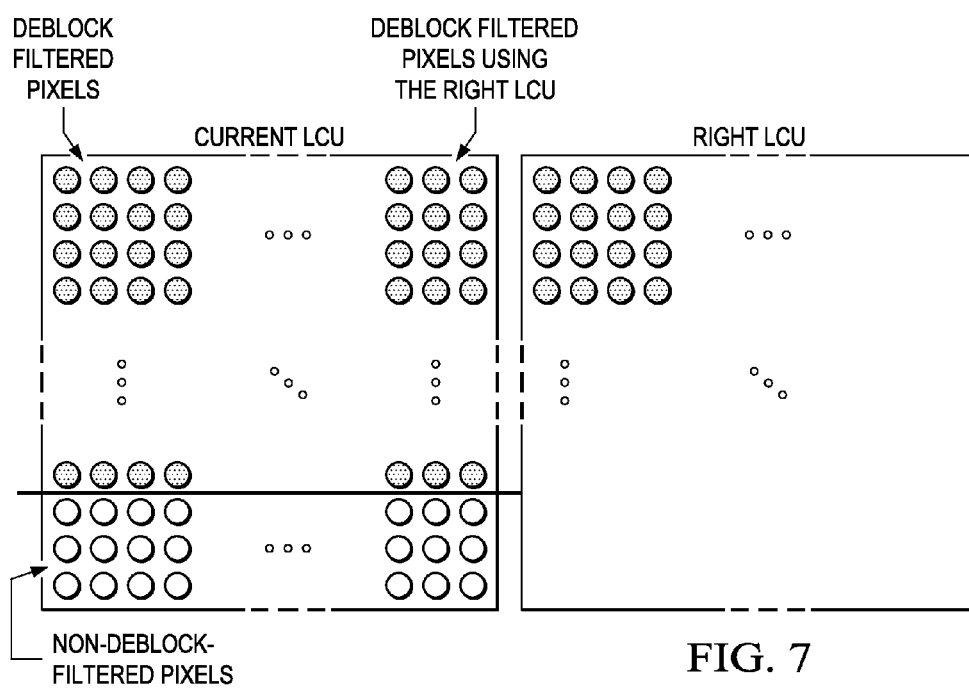
FIG. 7 is an embodiment depicting an illustration of pixels in an LCU that are deblock filtered using the right neighboring LCU.

In some embodiments, the SAO parameter estimation for an LCU waits until the right neighboring LCU is coded and the reconstructed pixels in the LCU that can be deblock filtered based on the right neighboring LCU are deblock filtered. The SAO parameter estimation then uses the available deblock filtered pixels and, as illustrated in FIG. 7, bottom pixel lines in the LCU are not deblock-filtered as the coding of the bottom neighboring LCU is not complete. Such embodiments incur delay until the coding of the right LCU is complete, but may provide better accuracy of SAO parameter estimation than embodiments that do not wait for the coding of the right neighboring LCU.

Figure 6:
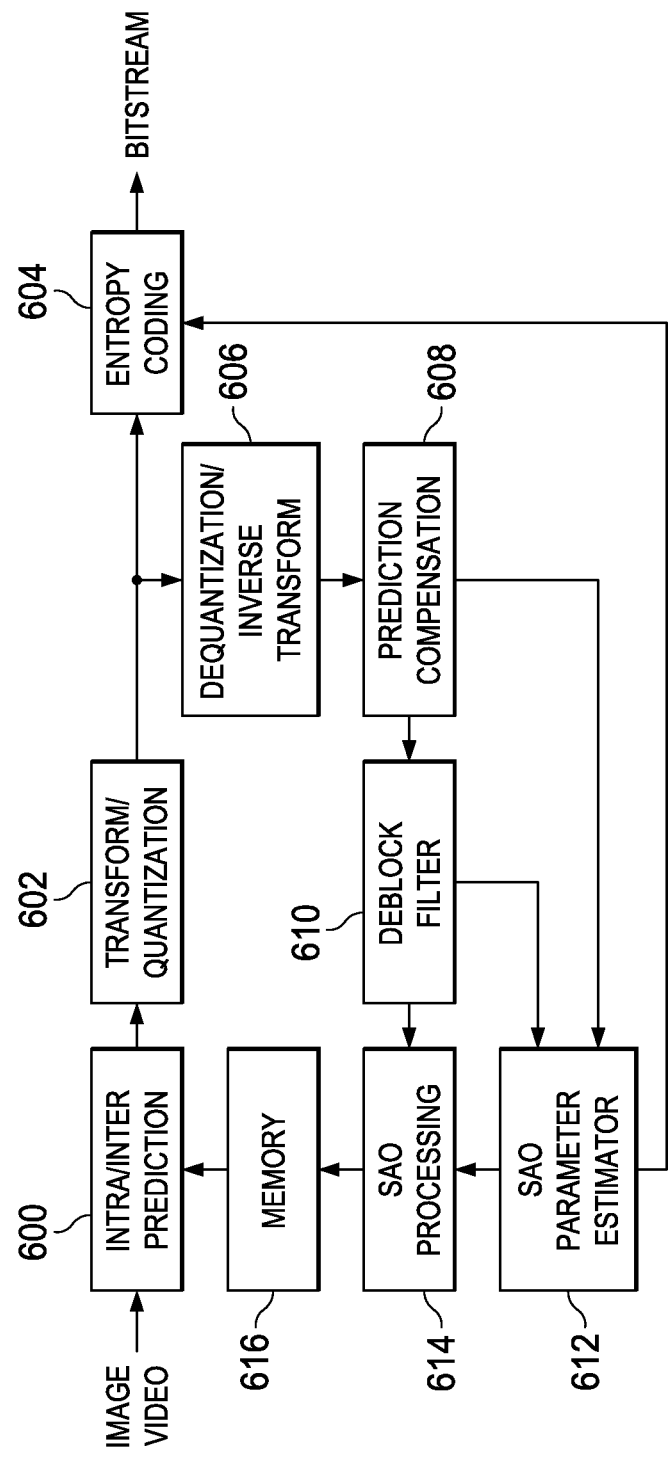
FIG. 6 is an embodiment depicting a block diagram of a video encoder including a sample adaptive offset parameter estimator using non-deblock-filtered pixels.

FIG. 6 shows a block diagram of the LCU processing portion of a video encoder in which SAO parameter estimation is performed using at least some non-deblock-filtered pixels. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs of the input video sequence from the coding control component and encodes the LCUs under the control of the coding control component to generate the compressed video stream. The LCUs in each picture are processed in row order. The LCUs from the coding control component are provided as one input of an intra/inter prediction component 600.

The memory component 616 provides reference data to the intra/inter prediction component 600. The reference data may include one or more previously encoded and decoded pictures, i.e., reference pictures.

The intra/inter prediction component 600 performs tests on CUs of an LCU based on multiple inter-prediction modes (e.g., skip mode, merge mode, and normal or direct inter-prediction), PU sizes, and TU sizes using reference picture data from storage 616 to choose the best CU partitioning, PU/TU partitioning, inter-prediction modes, motion vectors, etc. based on coding cost, e.g., a rate distortion coding cost. To perform the tests, the intra/inter prediction component 600 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU.

The intra/inter prediction component 600 also performs motion compensation based on the selected inter-prediction mode and other mode-related information to generate inter-predicted CUs. The inter-predicted CUs are provided to the mode decision component 428 along with the selected inter-prediction modes for the inter-predicted PUs and corresponding TU sizes for the selected CU/PU/TU partitioning. The coding costs of the inter-predicted CUs are also provided to the mode decision component 428.

The intra/inter prediction component 600 also performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra/inter prediction component 600 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra/inter prediction component 600 also generated intra-predicted CUs based on the selected mode or modes for the PU(s), the PU size, etc. The intra-predicted CUs are provided to the mode decision component 428 along with the selected intra-prediction modes for the intra-predicted PUs and corresponding TU sizes for the selected CU/PU/TU partitioning. The coding costs of the intra-predicted CUs are also provided to the mode decision component 428.

The intra/inter prediction component 600 selects between intra-prediction of a CU and inter-prediction of a CU based on the intra-prediction coding cost of the CU, the inter-prediction coding cost of the CU, and a picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 604. The intra/inter prediction component 600 also subtracts a predicted PU from the original PU. Each resulting residual PU is a set of pixel difference values that quantify differences between pixel values of the original PU and the predicted PU. The residual blocks of all the PUs of a CU form a residual CU for further processing. The associated transform unit size is also provided to the transform/quantization component 602.

The transform/quantization component 602 performs block transforms on the residual CUs to convert the residual pixel values to transform coefficients. More specifically, the transform/quantization component 602 receives the transform unit sizes for the residual CU and applies transforms of the specified sizes to the CU to generate transform coefficients. Further, the transform/quantization component 602 quantizes the transform coefficients based on quantization parameters (QPs) and quantization matrices provided by the coding control component and the transform sizes and provides the quantized transform coefficients to the entropy coding component 604 for coding in the bit stream.

The entropy coding component 604 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, flags indicating the CU/PU/TU partitioning of an LCU, the prediction modes for the CUs, and the quantized transform coefficients for the CUs. The entropy encoder 634 also codes relevant data from the SAO processing component 614 such as the LCU specific SAO information for each LCU. The LCU SAO information may be signaled on an LCU-by-LCU basis, e.g., the SAO information for an LCU may be signaled in the compressed bit stream immediately before encoded transform coefficients of the CUs.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to a dequantization/inverse transform component 606 along with the transform unit size used to generate the transform coefficients. The dequantization/inverse transform component 606 dequantizes the transform coefficients and applies inverse transform(s) of the specified size to the transform coefficients to reconstruct the residual values. The reconstructed residual CU is provided to the prediction compensation component 608, which adds the original predicted CU to the residual CU to generate a reconstructed CU, which becomes part of reconstructed picture data. The reconstructed picture data is stored in a buffer (not shown) for use in intra-prediction performed by the intra/inter prediction component 600.

Various in-loop filters may be applied to the reconstructed picture data to improve the quality of the reference picture data used for encoding/decoding of subsequent pictures. The in-loop filters may include a deblocking filter 610 and a sample adaptive offset filter (SAO) 614. Some embodiments also include an adaptive loop filter (ALF) (not shown). The in-loop filters 610, 614 are applied to each reconstructed LCU in the picture and the final filtered reference picture data is provided to the memory component 616.

For each LCU of the reconstructed picture, the SAO parameter estimator component 612 determines the best offset values, e.g., band offset values or edge offset values, to be added to pixels of that LCU to compensate for intensity shift that may have occurred during the block based coding of the picture and the SAO processing component 614 applies the offset values to the reconstructed LCU and determines the SAO information to be encoded in the bit stream for the LCU.

The SAO parameter estimator component 612 may use any suitable criteria for estimating the SAO filter types and offsets for the color components. For example, the SAO parameter estimator component 612 may decide the best SAO filter type and associated offsets for each color component based on a rate distortion technique that estimates the coding cost resulting from the use of each SAO filter type. More specifically, for each color component, the SAO parameter estimator component 612 may estimate the coding costs of SAO parameters, e.g., the SAO filter type and SAO offsets, resulting from using each of the predefined SAO filter types for the color component. The encoder may then select the option with the best coding cost for the color component. Some later versions of HEVC that provide for determining the SAO filter type and offsets at the LCU level provide an option for "merging" LCUs for purposes of signaling SAO parameters in the compressed bit stream. In addition to directly determining the best SAO filter type and offsets for the color components of an LCU, the SAO parameter estimator component 612 may also consider the coding costs resulting from using the SAO parameters of corresponding color components in left and upper neighboring LCUs (if these neighboring LCUs are available).

In some embodiments, the reconstructed pixels used by the SAO parameter estimator component 612 for SAO parameter estimation for an LCU are all non-deblock-filtered reconstructed pixels of the LCU. That is, the parameter estimation and the deblock filtering of the deblock filter component 610 are both performed on reconstructed pixels of an LCU. In such embodiments, the SAO parameter estimation processing of the SAO parameter estimator component 612 can be performed independently from the deblock filtering process of the deblock filter component 610. The estimated parameters are then applied by the SAO processing component 614 to the deblock filtered pixels of the LCU provided by the deblock filter component 610.

In some embodiments, the reconstructed pixels used by the SAO parameter estimator component 612 for SAO parameter estimation for an LCU are some deblock filtered pixels and some non-deblock-filtered pixels of an LCU. Specifically, as illustrated in FIG. 5 and FIG. 8, the non-deblock-filtered pixels used are those that require that coding of the left and bottom neighboring LCUs be completed before these pixels can be deblock filtered. In such embodiments, the SAO parameter estimator component 612 can perform SAO parameter estimation for an LCU that is partially deblock filtered without waiting until the deblock filtering process of the LCU is completed. Further, the number of unavailable lines to be used in the estimation, i.e., the number of horizontal or vertical lines of non-deblock-filtered pixels to be used, is set according to the SAO type and color component type. The number of rows and columns of non-deblock-filtered pixels depends on the particular implementation of deblock filtering used in the deblock filter component 610. This may also different for each color component if different deblocking filter tap lengths are applied for each color component. Table 3 shows one example of specifying the number of horizontal or vertical lines of non-deblock-filtered pixels, i.e., unavailable pixel lines, according to SAO type and color component in version HM-7.0 of the HEVC reference software.

Because such embodiments use the deblock filtered pixels available for an LCU, the accuracy of SAO estimation is improved as compared to using no deblock filtered pixels. For example, representative test cases using modified HM-7.0 software showed coding improvements of 1.8% for 16×16 LCUs and 0.3% for 64×64 LCUs. Note that in such embodiments, as illustrated in the examples of FIG. 5 and FIG. 8, no delay is incurred due to waiting for the bottom and right neighboring LCUs to be coded as in the prior art.

In some embodiments, the SAO parameter estimator component 612 waits until the right neighboring LCU of an LCU is coded and the reconstructed pixels in the LCU that can be deblock filtered based on the right neighboring LCU are deblock filtered. The SAO parameter estimator component 612 then uses the available deblock filtered pixels and, as illustrated in FIG. 7, bottom pixel lines in the LCU that are not deblock filtered as the coding of the bottom neighboring LCU is not complete. Such embodiments incur delay until the coding of the right LCU is complete, but may provide better accuracy of SAO parameter estimation than embodiments that do not wait for the coding of the right neighboring LCU.

Figure 9:
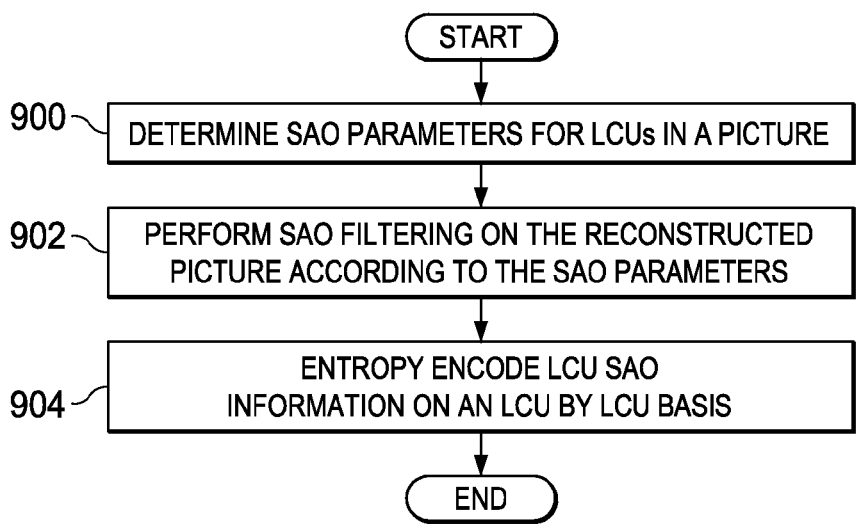
FIG. 9 is an embodiment of a method for performing sample adaptive offset filtering in an encoder.

FIG. 9 is a flow diagram of a method for SAO filtering that may be performed in a video encoder, e.g., the encoder of FIG. 6. In general, in this method, SAO parameters are determined for each LCU in a picture, SAO filtering is performed on each LCU according to the SAO parameters determined for the LCUs, and SAO information for each LCU is encoded in the bit stream interleaved with the LCU data. In an encoder, method step 900 may be performed by an SAO parameter estimator, e.g., the SAO parameter estimator component 612 of FIG. 6, method step 902 may be performed by an SAO filter, e.g., the SAO processing component 614 of FIG. 6, and method step 904 may be performed by an entropy encoder, e.g., entropy encoder 604 of FIG. 6.

Referring now to FIG. 9, SAO parameters are determined 900 for reconstructed LCUs in a picture. That is, SAO parameters are determined for each LCU in the picture. Any suitable technique may be used for determining the LCU SAO parameters for an LCU. In some embodiments, for each reconstructed LCU, the reconstructed pixels used for SAO parameter estimation are all non-deblock-filtered pixels.

In some embodiments, for each reconstructed LCU, some deblock filtered pixels and some non-deblock-filtered pixels of the LCU are used for SAO parameter estimation. Specifically, as illustrated in the examples of FIG. 5 and FIG. 8, the non-deblock-filtered pixels used are those that require that coding of the right and bottom neighboring LCUs be completed before these pixels can be deblock filtered. In such embodiments, the SAO parameter SAO parameter estimation is performed for an LCU that is partially deblock filtered without waiting until the deblock filtering process of the LCU is completed. Further, in some embodiments, the number of unavailable lines to be used in the estimation, i.e., the number of horizontal or vertical lines of non-deblock-filtered pixels to be used, is set according to the SAO type and color component type. This may also different for each color component if different deblocking filter tap lengths are applied for each color component. Table 3 shows one example of specifying the number of horizontal or vertical lines of non-deblock-filtered pixels, i.e., unavailable pixel lines, according to SAO type and color component in version HM-7.0 of the HEVC reference software.

In some embodiments, the number of unavailable horizontal and vertical lines is fixed independent of the SAO type and color component type. Any suitable number of lines may be used. For example, the number of horizontal and vertical lines may be set to the maximum values of Table 3, e.g., for the luma component, the number bottom lines=4 and the number of right lines=5. Using a fixed number of lines avoids the complexity of checking SAO type and component type when determining the number of horizontal and vertical lines. The number of rows and columns of non-deblock-filtered pixels depends on the particular implementation of deblock filtering used.

In some embodiments, the SAO parameter estimation waits until the right neighboring LCU of an LCU is coded and the reconstructed pixels in the LCU that can be deblock filtered based on the right neighboring LCU are deblock filtered. The SAO parameter estimation then uses the available deblock filtered pixels and, as illustrated in FIG. 7, bottom pixel lines in the LCU that are not deblock filtered as the coding of the bottom neighboring LCU is not complete.

SAO filtering is then performed 902 on the reconstructed picture according to the SAO parameters determined for the LCUs. More specifically, SAO filtering is performed on each LCU according to the particular SAO parameters determined for that LCU. In general, the SAO filtering applies the specified offsets in the SAO parameters to pixels in the LCU according to the filter type indicated in the SAO parameters. SAO information to be encoded in the bit stream for that LCU is also determined. The content of the SAO information depends on the particular syntax element defined in the video coding standard in use, but includes syntax elements indicative of SAO parameters such as the SAO filter type and the offsets for each LCU.

The LCU specific SAO information for each LCU is also entropy coded 904 into the compressed bit stream on an LCU by LCU basis, i.e., the LCU specific SAO information is interleaved with the LCU data in the compressed bit stream.

Figure 10:
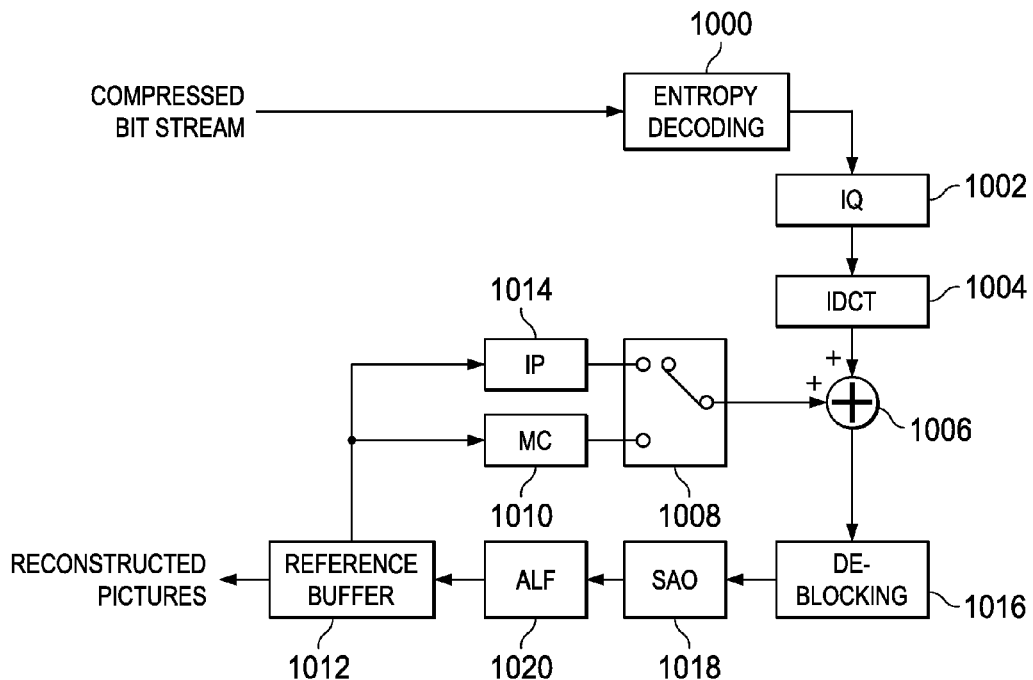
FIG. 10 shows a block diagram of an example video decoder.

FIG. 10 is a block diagram of an example video decoder. The video decoder operates to reverse the encoding operations, i.e., entropy coding, quantization, transformation, and prediction, performed by a video encoder to regenerate the pictures of the original video sequence. In view of the above description of a video encoder, one of ordinary skill in the art will understand the functionality of components of the video decoder without detailed explanation.

The entropy decoding component 1000 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, LCU specific SAO information, etc. The decoded syntax elements are passed to the various components of the decoder as needed. For example, decoded prediction modes are provided to the intra-prediction component (IP) 1014 or motion compensation component (MC) 1010. If the decoded prediction mode is an inter-prediction mode, the entropy decoder 1000 reconstructs the motion vector(s) as needed and provides the motion vector(s) to the motion compensation component 1010.

The inverse quantize component (IQ) 1002 de-quantizes the quantized transform coefficients of the CUs. The inverse transform component 1004 transforms the frequency domain data from the inverse quantize component 1002 back to the residual CUs. That is, the inverse transform component 1004 applies an inverse unit transform, i.e., the inverse of the unit transform used for encoding, to the de-quantized residual coefficients to produce reconstructed residual values of the CUs.

A residual CU supplies one input of the addition component 1006. The other input of the addition component 1006 comes from the mode switch 1008. When an inter-prediction mode is signaled in the encoded video stream, the mode switch 1008 selects predicted PUs from the motion compensation component 1010 and when an intra-prediction mode is signaled, the mode switch selects predicted PUs from the intra-prediction component 1014.

The motion compensation component 1010 receives reference data from the storage component 1012 and applies the motion compensation computed by the encoder and transmitted in the encoded video bit stream to the reference data to generate a predicted PU. That is, the motion compensation component 1010 uses the motion vector(s) from the entropy decoder 1000 and the reference data to generate a predicted PU.

The intra-prediction component 1014 receives reconstructed samples from previously reconstructed PUs of a current picture from the storage component 1012 and performs the intra-prediction computed by the encoder as signaled by an intra-prediction mode transmitted in the encoded video bit stream using the reconstructed samples as needed to generate a predicted PU.

The addition component 1006 generates a reconstructed CU by adding the predicted PUs selected by the mode switch 1008 and the residual CU. The output of the addition component 1006, i.e., the reconstructed CUs, is stored in the storage component 1012 for use by the intra-prediction component 1014.

In-loop filters are applied to reconstructed picture data to improve the quality of the decoded pictures and the quality of the reference picture data used for decoding of subsequent pictures. The applied in-loop filters are the same as those of the encoder, i.e., a deblocking filter 1016, a sample adaptive offset filter (SAO) 1018, and an adaptive loop filter (ALF) 1020. The in-loop filters may be applied on an LCU-by-LCU basis and the final filtered reference picture data is provided to the storage component 1012. In some embodiments, the ALF component 1020 is not present.

The deblocking filter 1016 applies the same deblocking as performed in the encoder. In general, for each reconstructed LCU, the SAO filter 1018 applies the offset values determined by the encoder for the LCU to the pixels of the LCU. More specifically, the SAO filter 1018 receives decoded LCU specific SAO information from the entropy decoding component 1000 for each reconstructed LCU, determines the SAO parameters for the LCU from the SAO information, and applies the determined offset values to the deblocked reconstructed pixels of the LCU according to values of other parameters in the SAO parameter set.

Figure 11:
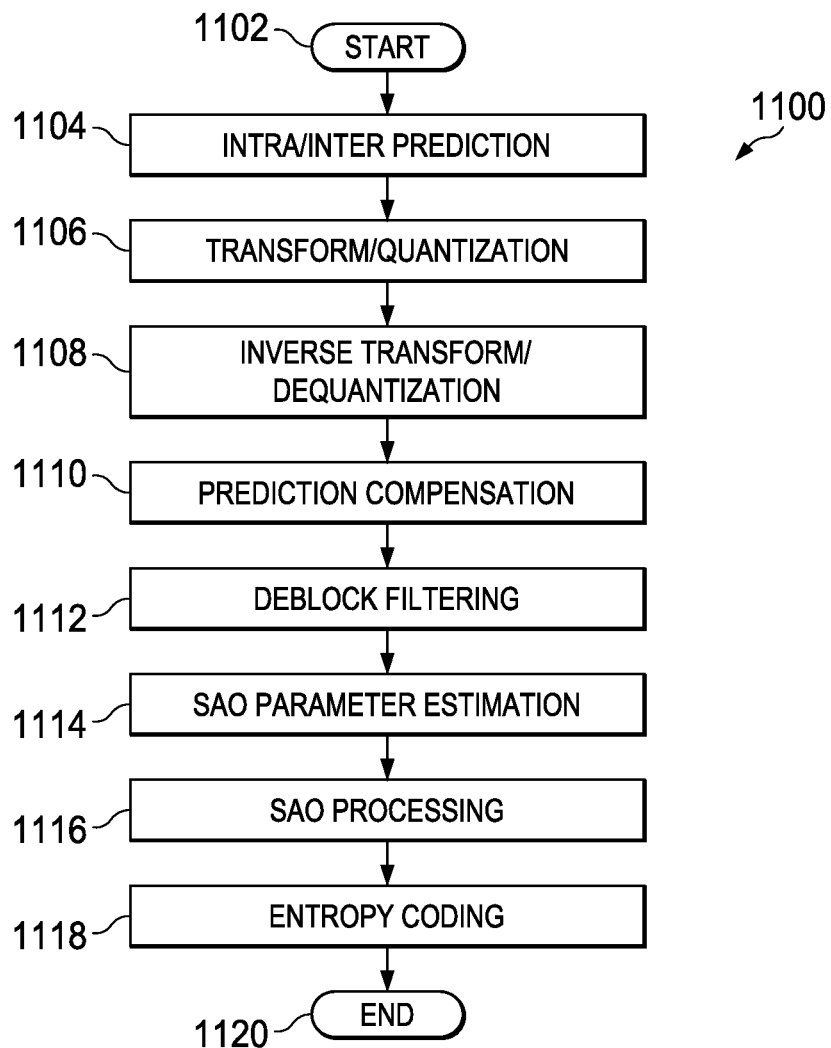
FIG. 11 is an embodiment of a method for an encoder utilizing sample adaptive offset parameter estimation.

FIG. 11 is an embodiment of a method 1100 for an encoder utilizing sample adaptive offset parameter estimation for image and video coding. The method 1100 is usually performed for each LCU. The method 1100 starts at step 1102 and proceeds to step 1104. At step 1104, the method 1100 performs inter/intra prediction. At step 1106, the method 1100 performs quantization and calculates the related transform. At step 1108, the method 1100 performs inverse transform/quantization. At step 1110, the method 1100 performs prediction compensation. At step 1112, the method 1100 performs deblock filtering. At step 1114, the method 1100 performs an embodiment of SAO parameter estimation as described herein in which at least some non-deblocked-pixels are used. At step 1116, the method 1100 performs SAO filtering using the estimated parameters. At step 1118, the method 1100 performs entropy coding. The method 1100 ends at step 1120.

Figure 12:
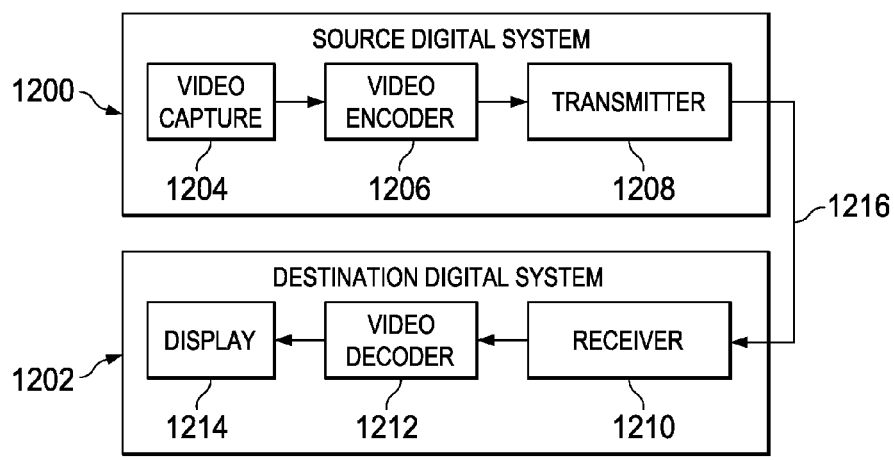
FIGS. 12 and 13 are block diagrams of illustrative digital systems.

FIG. 12 shows a block diagram of a digital system that includes a source digital system 1200 that transmits encoded video sequences to a destination digital system 1202 via a communication channel 1216. The source digital system 1200 includes a video capture component 1204, a video encoder component 1206, and a transmitter component 1208. The video capture component 1204 is configured to provide a video sequence to be encoded by the video encoder component 1206. The video capture component 1204 may be, for example, a video camera, a video archive, or a video feed from a video content provider. In some embodiments, the video capture component 1204 may generate computer graphics as the video sequence, or a combination of live video, archived video, and/or computer-generated video.

The video encoder component 1206 receives a video sequence from the video capture component 1204 and encodes it for transmission by the transmitter component 1208. The video encoder component 1206 receives the video sequence from the video capture component 1204 as a sequence of pictures, divides the pictures into largest coding units (LCUs), and encodes the video data in the LCUs. The video encoder component 1206 may be configured to perform SAO parameter estimation during the encoding process as described herein. An embodiment of the video encoder component 1206 is described in more detail herein in reference to FIG. 6.

The transmitter component 1208 transmits the encoded video data to the destination digital system 1202 via the communication channel 1216. The communication channel 1216 may be any communication medium, or combination of communication media suitable for transmission of the encoded video sequence, such as, for example, wired or wireless communication media, a local area network, or a wide area network.

The destination digital system 1202 includes a receiver component 1210, a video decoder component 1212 and a display component 1214. The receiver component 1210 receives the encoded video data from the source digital system 1200 via the communication channel 1216 and provides the encoded video data to the video decoder component 1212 for decoding. The video decoder component 1212 reverses the encoding process performed by the video encoder component 1206 to reconstruct the LCUs of the video sequence. The video decoder component 1212 may be configured to perform SAO filtering during the decoding process as described herein. An embodiment of the video decoder component 1212 is described in more detail herein in reference to FIG. 10.

The reconstructed video sequence is displayed on the display component 1214. The display component 1214 may be any suitable display device such as, for example, a plasma display, a liquid crystal display (LCD), a light emitting diode (LED) display, etc.

In some embodiments, the source digital system 1200 may also include a receiver component and a video decoder component and/or the destination digital system 1202 may include a transmitter component and a video encoder component for transmission of video sequences both directions for video steaming, video broadcasting, and video telephony. Further, the video encoder component 1206 and the video decoder component 1212 may perform encoding and decoding in accordance with one or more video compression standards. The video encoder component 1206 and the video decoder component 1212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 13:
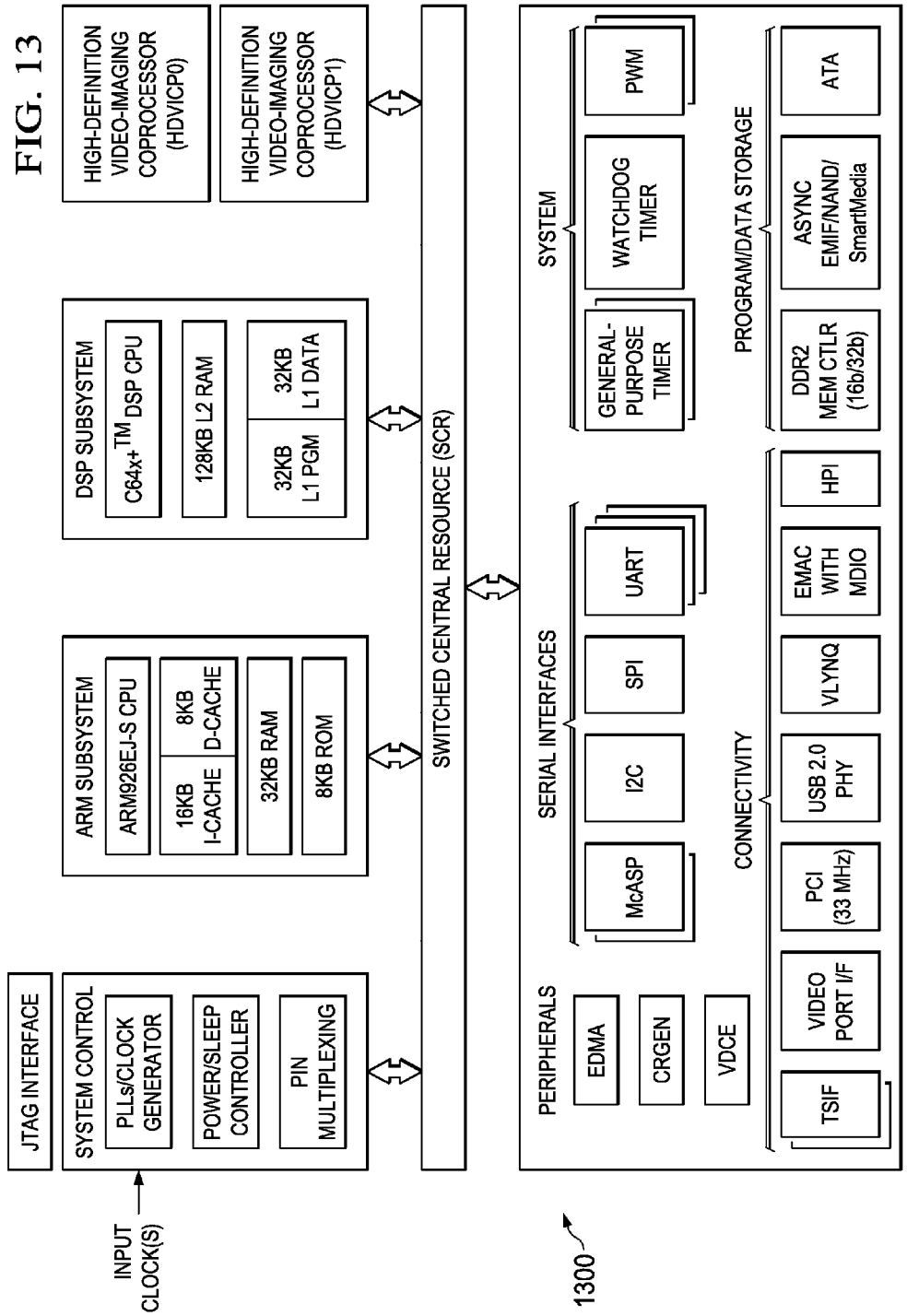

FIG. 13 is a block diagram of an example digital system suitable for use as an embedded system that may be configured to perform SAO filtering and SAO parameter estimation as described herein during encoding of a video stream and/or SAO filtering during decoding of an encoded video bit stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1300 is a programmable platform designed to meet the processing needs of applications such as video encode/decode/transcode/transrate, video surveillance, video conferencing, set-top box, medical imaging, media server, gaming, digital signage, etc. The SoC 1300 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1300 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+™ core with a very-long-instruction-word (VLIW) architecture. In general, the ARM is responsible for configuration and control of the SoC 1300, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1300 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 13, the SoC 1300 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, quantization, and in-loop filtering. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1300 may be configured to perform SAO filtering and SAO parameter estimation during video encoding and/or SAO filtering during decoding of an encoded video bitstream using techniques described herein. For example, the coding control of the video encoder of FIG. 6 may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors. At least some of the computational operations of the SAO filtering and SAO parameter estimation during encoding of a video stream may also be executed on the HDVICP coprocessors. Similarly, at least some of the computational operations of the various components of the video decoder of FIG. 10, including entropy decoding, inverse quantization, inverse transformation, intra-prediction, and motion compensation may be executed on the HDVICP coprocessors. Further, at least some of the computational operations of the SAO filtering during decoding of an encoded video bit stream may also be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, particular SAO filter types, edge directions, pixel categories, numbers of offset values, etc., drawn from versions of the emerging HEVC standard have been described above. One of ordinary skill in the art will understand embodiments in which the SAO filter types, edge directions, pixel categories, number of offset values, and/or other specific details of SAO filtering differ from the ones described.

In another example, embodiments have been described herein in which the lines of non-deblock-filtered reconstructed pixels in an LCU that may be used for SAO parameter estimation are bottom lines and right column lines. One of ordinary skill in the art will understand embodiments in which the lines of non-deblock-filtered pixels used for SAO parameter estimation may also include one or more top lines and left column lines. For example, if encoding is implemented on a multi-core processor, portions of a picture may be encoded in parallel on separate cores. Deblock filtering of top and left column lines of reconstructed pixels of an LCU at a top and/or left boundary of a separately encoded picture portion require that coding of a top and/or left neighboring LCU is completed. The necessary information to deblock filter such lines will not be timely available as the neighboring LCUs are coded on a separate core or cores. In such embodiments, SAO parameter estimation may be performed using non-deblock-filtered reconstructed pixels for the unavailable top and left lines as needed.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for sample adaptive offset (SAO) filtering in a video encoder, the method comprising:
    estimating SAO parameters for color components of a largest coding (LCU) of a picture, wherein estimating the SAO parameters comprises using at least some non-deblock-filtered reconstructed pixels of the LCU and some deblock-filtered reconstructed pixels of the LCU to estimate the SAO parameters;
    performing SAO filtering on the reconstructed LCU according to the estimated SAO parameters;
    wherein the at least some non-deblock-filtered reconstructed pixels consist of reconstructed pixels from right column lines of reconstructed pixels and bottom lines of reconstructed pixels of the LCU that are not deblock filtered, and
    entropy encoding SAO information for the LCU in a compressed video bit stream, wherein the SAO information signals the estimated SAO parameters for the LCU.

2. A non-transitory computer-readable medium comprising instructions that, when executed by at least one processor, cause the at least one processor to:
- estimate sample adaptive offset (SAO) parameters for color components of a largest coding unit (LCU) of a picture, wherein estimating the SAO parameters comprises using at least some non-deblock-filtered reconstructed pixels of the LCU and deblock-filtered reconstructed pixels of the LCU to estimate the SAO parameters:
- perform SAO filtering on the reconstructed LCU according to the estimated SAO parameters;
- wherein the at least some non-deblock-filtered reconstructed pixels consist of reconstructed pixels from right column lines of reconstructed pixels and bottom lines of reconstructed pixels of the LCU that are not deblock filtered, and
- entropy encoding SAO information for the LCU in a compressed video bit stream, wherein the SAO information signals the estimated SAO parameters for the LCU.

* * * * *